March 3, 1970          A. RAZDOW          3,498,691

PARALLAX-FREE TELESCOPIC SIGHT

Filed Dec. 26, 1967          5 Sheets-Sheet 1

INVENTOR
Adolph Razdow
BY Michael S. Striker
ATTORNEY

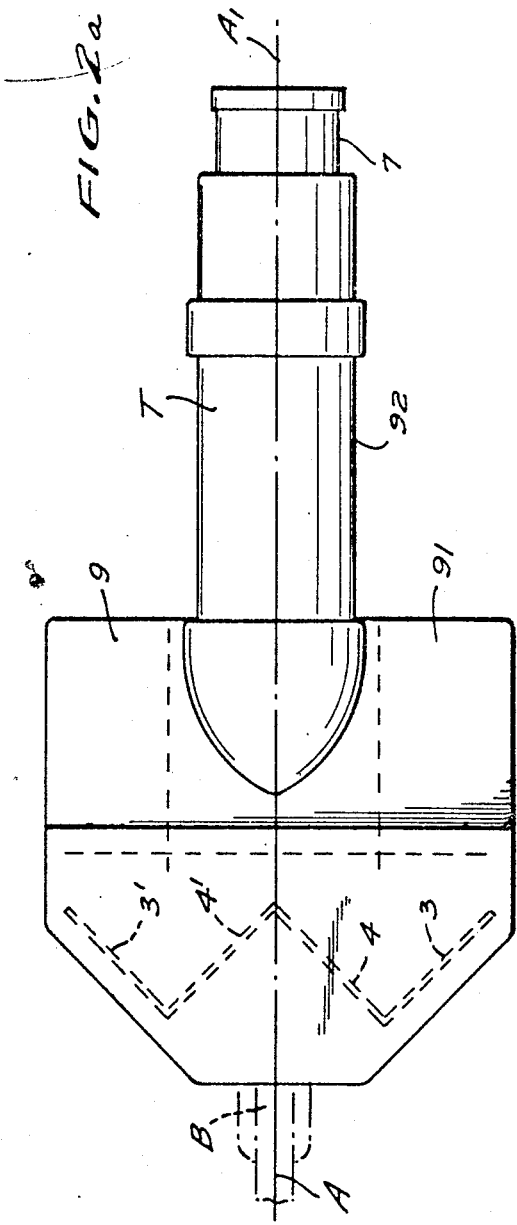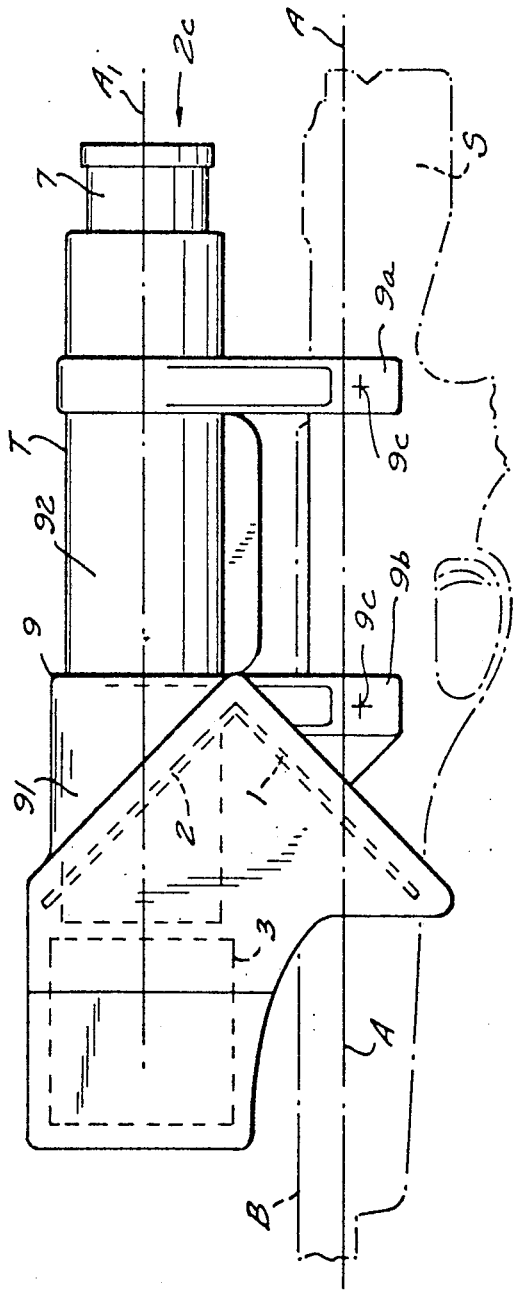

INVENTOR
Adolph Razdow
BY
ATTORNEY

March 3, 1970 A. RAZDOW 3,498,691
PARALLAX-FREE TELESCOPIC SIGHT
Filed Dec. 26, 1967 5 Sheets-Sheet 4

INVENTOR
Adolph Razdow
BY
ATTORNEY

March 3, 1970  A. RAZDOW  3,498,691
PARALLAX-FREE TELESCOPIC SIGHT
Filed Dec. 26, 1967  5 Sheets-Sheet 5
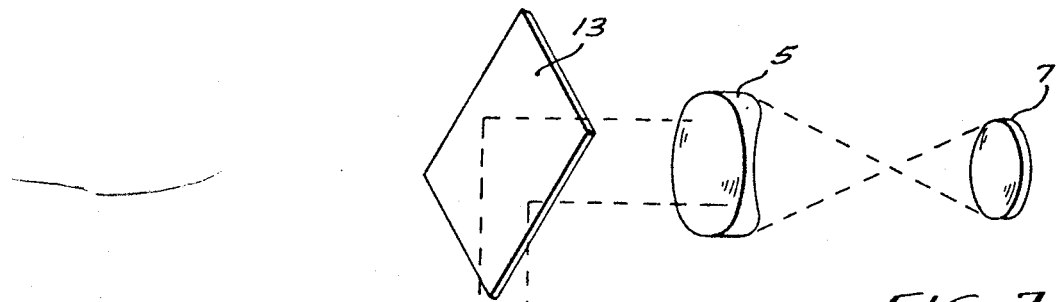
FIG. 7
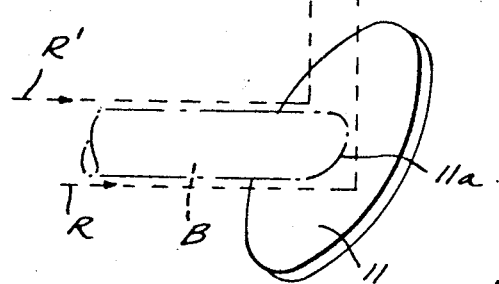
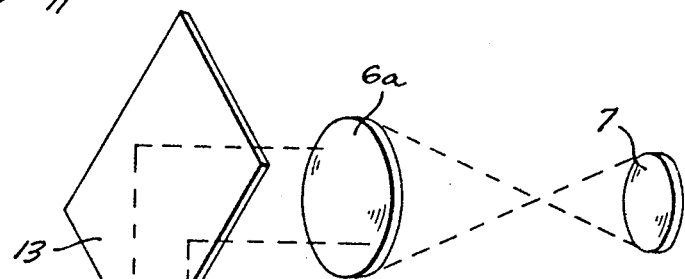
FIG. 8
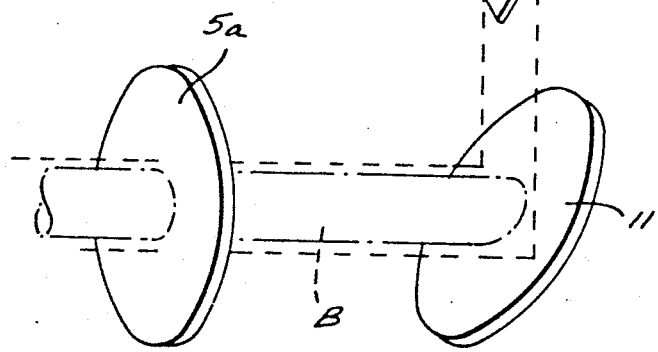
INVENTOR
Adolph Razdow
BY
Michael S. Strikes
ATTORNEY 3,498,691
PARALLAX-FREE TELESCOPIC SIGHT
Adolph Razdow, Montclair, N.J., assignor to Razdow Laboratories Inc., Newark, N.J.
Filed Dec. 26, 1967, Ser. No. 693,644
Int. Cl. G02b 23/00, 23/02, 17/00
U.S. Cl. 350—33
10 Claims

ABSTRACT OF THE DISCLOSURE

A telescopic rifle sight has two slanted reflecting surfaces on opposite sides of the rifle barrel which project two bundles of rays coming from the target area without parallax error to a symmetrical mirror system by which the bundles of rays are projected into an objective which forms an image of the target area for observation through an eyepiece, or projects the image onto a screen.

BACKGROUND OF THE INVENTION

It is known to provide telescopic sights on the barrels of rifles, large telescopes, or other devices which are to be aimed at a target. Telescopic sights are mounted on top of the barrel and have to be slightly inclined in order to compensate for the parallax error introduced by the distance between the axis of the barrel and the optical axis of the telescopic sight. If the distance from the target changes, the telescopic sight has to be adjusted so that its optical axis defines a different angle with the barrel axis.

In conventional telescopic sights, the eye becomes a part of the optical system by observing the image of the target through an eyepiece. Consequently, it is a first disadvantage of known telescopic sights that an adjustment of the telescopic sight to compensate for parallax errors is required, and a second disadvantage is the necessity of placing the eye directly in the unbroken optical axis from the eyepiece to the target.

SUMMARY OF THE INVENTION

It is one object of the invention to overcome the disadvantages of known telescopic sights, particularly telescopic rifle sights, and to provide a parallax-free telescopic sight which does not require adjustment when aimed at targets at different distances.

Another object of the invention is to provide a telescopic sight permitting the aiming person to place the eye in a convenient position.

Another object of the invention is to provide a telescopic sight forming a real image on a screen.

Another object of the invention is to provide a screen or an eyepiece in a suitable position above the aimed barrel, but to form an image of the target area by reflecting means located at the horizontal level of the barrel axis so that the telescopic sight is free of parallax and need not be in the line of sight to the target.

With these objects in view, the present invention is concerned with a telescopic sight which is used with a barrel to be aimed at a target area. An embodiment of the invention comprises two reflecting means located on opposite sides of the barrel for upwardly reflecting rays coming from the target area, optical means, preferably including other reflecting means and lens means, for forming of the rays reflected by the two reflecting means an image of the target area, and viewing means for viewing the image.

In one construction of the invention, the viewing means is a preferably slanted ground glass or frosted glass reticle screen onto which the image of the target area is projected. In another construction of the invention, the viewing means include an eyepiece for viewing the image.

The two reflecting means have reflecting surfaces slanted at an angle of substantially 45° to a vertical plane perpendicularly intersecting the axis of the barrel and having portions located above, and portions located below the barrel axis.

As noted above, the optical means include such a number of reflecting surfaces so that the image viewed by the aiming person is neither upside down nor laterally reversed.

The position of the reflecting means and of all reflecting surfaces is adjusted to a relative position in which the two bundles of rays reflected by the two slanted reflecting faces at the level of the barrel axis, form two image portions which are adjacent and form an uninterrupted image of the target area for observation by the aimining person.

In another embodiment of the invention, the two slanted reflecting surfaces are part of a substantially elliptic mirror so that a mirror portion located above the barrel connects the two image portions formed by the lateral mirror portions. A cutout facilitating mounting of the elliptic mirror on the barrel is advantageously provided which has no influence on the forming of the observed image since the rays reflected by a mirror portion located under the barrel are blocked by the barrel and cannot form an image portion.

The lens means comprise an objective lens, a reticle, an erector lens, and a screen or eyepiece. The objective lens may be mounted on the barrel rearward of the reflecting means, but in a modified embodiment of the invention, the objective lens is made annular and surrounds the barrel forwardly of the reflecting means, while the erector lens is provided rearward of the reflecting means together with the screen or eyepiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1b is a fragmentary schematic side elevation of the embodiment of FIG. 1a;

FIG. 1c is a fragmentary schematic front elevation of the embodiment of FIG. 1a;

FIG. 2a is a plan view illustarting a telescopic sight according to the embodiment of FIGS. 1a to 1c;

FIG. 2b is a side elevation of the telescopic sight;

FIG. 3 is a fragmentary schematic side elevation illustrating, by way of example, preferred dimensions of the embodiment of FIG. 2a;

FIG. 5b is a view along the barrel illustrating the mirror of FIG. 5a;

FIG. 7 is a fragmentary schematic perspective side view of a simplified third embodiment of the invention;

FIG. 8 is a fragmentary schematic perspective side view of a simplified fourth embodiment.

DESCRIPTION OF THE PREFERRED EMBODIMENTS

Figure 1A:
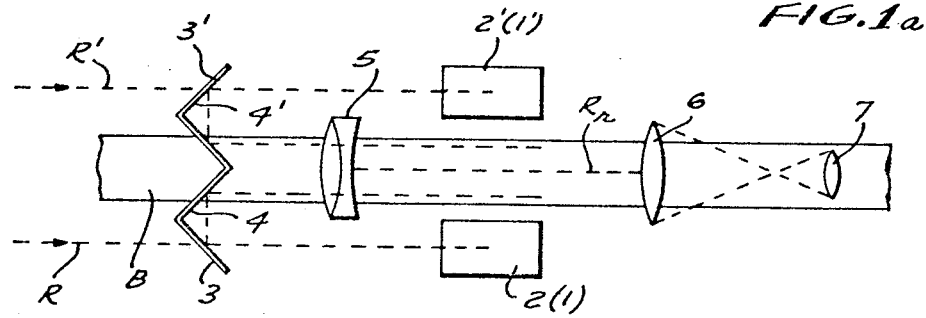
FIG. 1a is a fragmentary schematic plan view illustrating a first embodiment of the invention.
Figure 1B:
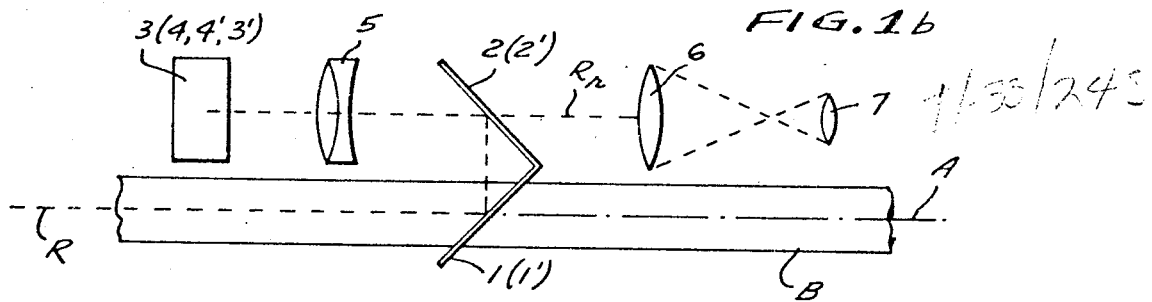
Figure 1C:
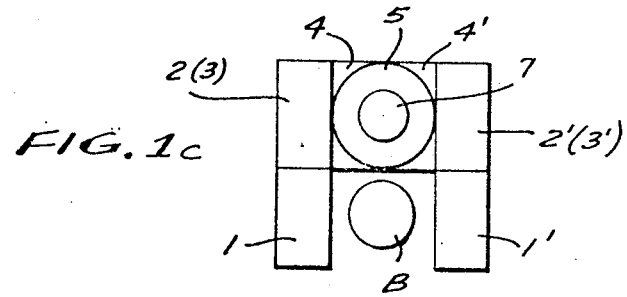
Figure 2C:
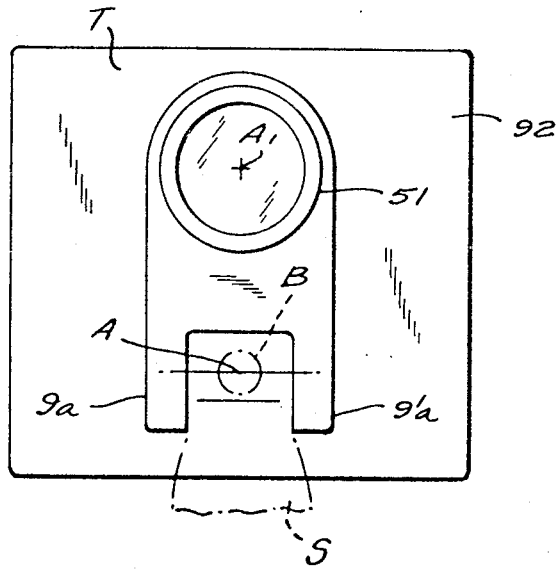
FIG. 2c is an end view of the telescopic sight viewed in the direction of the arrow 2c in FIG. 2b.

Referring first to FIGS. 1a to 1c and FIGS. 2a to 2c, a rifle has a stock S and a barrel B with a barrel axis A, as best seen in FIG. 2b. A telescopic rifle sight T has a casing 9 with brackets 9a and 9b secured to the rifle stock by screws 9c. The casing 9 includes a housing 91, and a tubular portion 92 in which an eyepiece 7 is mounted. The telescopic sight has an axis $A_1$ located in a vertical plane passing through the barrel axis A.

Housing 91 envelopes two units respectively including mirrors 1, 2 and 1', 2' located on opposite sides of barrel B, and a third unit including two pairs of mirrors 3, 4 and 3', 4' and disposed above and across the barrel B, as best seen in FIG. 2a.

As best seen in FIGS. 1a, 1b and 1c, two first reflecting means 1 and 1' are located on opposite sides of the barrel. Reflecting means 1 and 1' are mirrors having reflecting front surfaces slanted at angles of 45° to a plane perpendicular to the barrel axis A and to a horizontal plane through the same, assuming that the barrel is in a horizontal position.

Second reflecting means in the form of mirrors 2, 2' are respectively located above the first reflecting means 1, 1' and have reflecting surfaces defining angles of 90° with reflecting surfaces of mirrors 1, 1'. Two bundles of rays R and R' from the target area are upwardly reflected by the first reflecting means 1, 1' and then again reflected by the second reflecting means 2, 2', respectively, along barrel B and parallel to the axis of the same.

Third reflecting means in the form of mirrors 3 and 3' respectively receive the bundles of rays reflected by the second reflecting means 2, 2' and reflect the same inward in the direction transverse to the axis A, whereupon the two bundles of rays are again reflected by fourth reflecting means 4, 4' parallel to the axis of the barrel and into an objective lens 5, located in casing 9, and having an optical axis $A_1$ in a vertical plane passing through the barrel axis A. The lens means of the telescopic sight further includes an erector lens 6 forming an image, and an eyepiece 7 with a lens for viewing the image and a reticle located in the focal plane of objective lens 5.

The third reflecting means 3, 3' are mirrors whose reflecting surfaces are slanted at angles of 45° to a plane perpendicular to the barrel axis, and the fourth reflecting means are mirrors 4, 4' slanted at angles of 45° to a plane perpendicular to the barrel axis, and at angles of 90° to mirrors 3 and 3'.

The first reflecting means 1, 1' are located at the level of the barrel axis A and form two image portions of the target area. In order to obtain an uninterrupted image of the entire target area for viewing through eyepiece 7, some or all reflecting means are slightly adjusted during assembly of the telescopic sight, so that the two bundles of rays form two adjacent images of the target area. After passing through objective lens 5, the two bundles of rays R and R' are combined in a single bundle of rays $R_r$.

In accordance with the invention, the number of reflecting surfaces of reflecting means 2, 3, 4 and 2', 3', 4' is selected so that lens means 5 and 6 form an image of the target area which is neither upside down nor laterally reversed.

Figure 3:
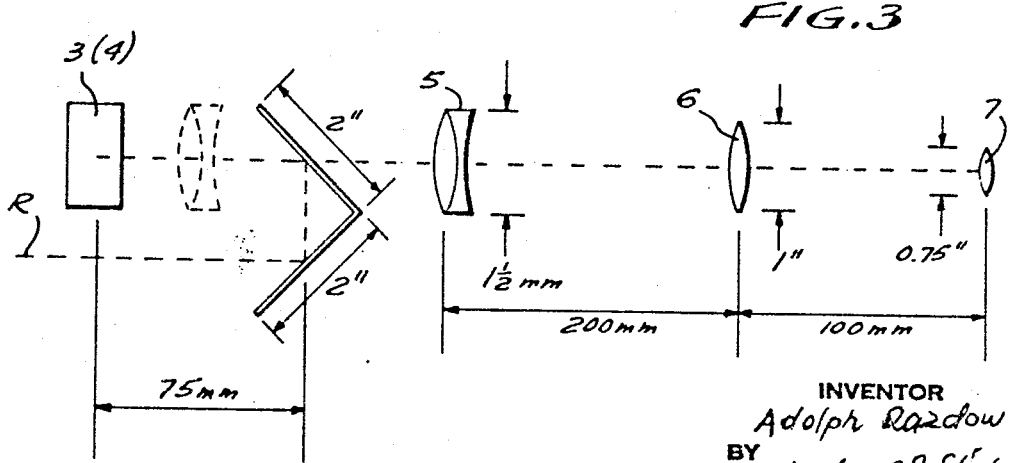

FIG. 3 shows, by way of example, preferred dimensions of the above-described first embodiment. Reflecting means 2 and 3 are spaced 75 mm. Each mirror 1, 1', 2, 2' is 1 inch wide and 2 inches high. Each mirror 3, 3', 4, 4' is 1 inch wide and 1.5 inches high. Objective 5 has a focal length of 300 mm. and a diameter of 1.5 inches. Objective lens 5 may be disposed rearward of reflecting means 2, 2', or forwardly of the same as shown in broken lines in FIG. 3 and also in FIGS. 1a and 1b. However, objective lens 5 must be located rearward of reflecting means 4, 4'. The erector lens 6 has a diameter of 1 inch and is spaced 200 mm. from the objective lens 5 and 100 mm. from the lens of eyepiece 7 which has a diameter of 0.75 inch. The focal length of the eyepiece may be 20 mm.

Figure 4:
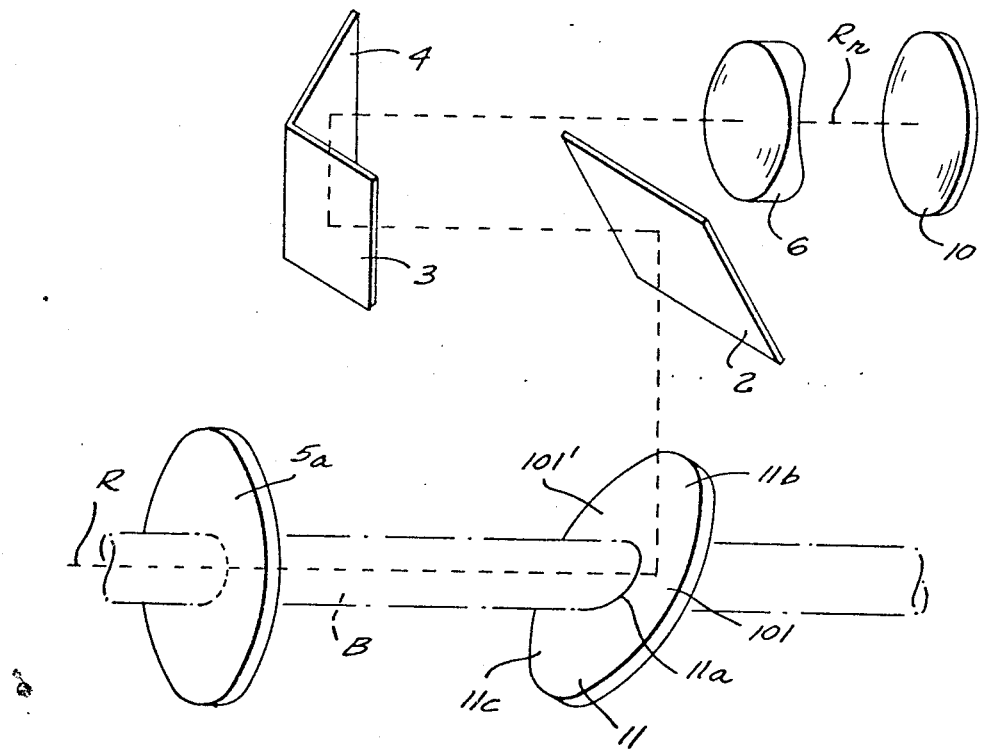
FIG. 4 is a fragmentary schematic perspective view illustrating a second embodiment of the invention provided with an objective lens in front of a slanted elliptic mirror and with a viewing screen.

FIG. 4 illustrates a second embodiment of the invention which operates on the same principle and has a number of parts corresponding to the parts of the first-described embodiment, and being indicated by like reference numerals.

The barrel B passes through a central opening 11a of an elliptic mirror 11 which is slanted to the barrel as described with reference to the first reflecting means 1, 1' of the first-described embodiment. The lateral portions 101 and 101' correspond to the mirrors 1 and 1' and reflect the two bundles of rays R and R'. The elliptic mirror 11 has a third reflecting portion 11b located above the barrel between the lateral reflecting portions 101 and 101', and a fourth reflecting portion 11c located under the barrel B between the lateral reflecting portions 101 and 101'.

An annular objective lens 5a is located forwardly of the first reflecting means 11 and surrounds the barrel B. Rays from the target area pass through objective lens 5a to the first elliptic reflecting means 11 and are reflected by the same in upward direction. A first bundle of rays R is reflected by lateral portion 101 and by parts of portions 11b and 11c toward mirror 2, while a second bundle of rays R' is reflected by lateral portion 101' and parts of reflecting portions 11b and 11c toward a corresponding mirror 2' which is part of the second symmetrical mirror system 2', 3', 4' described with reference to FIG. 1a, and not illustrated in FIG. 4. The bundles of rays are reflected by the third reflecting means 3, 4 and 3', 4' and pass into the erector lens 6 which forms a continuous uninterrupted image of the target area on a screen 10, which may be made of ground or frosted glass and has a reticle. Screen 10 and the reticle are located in the focal plane of the lens means 5a, 6.

Figure 5A:
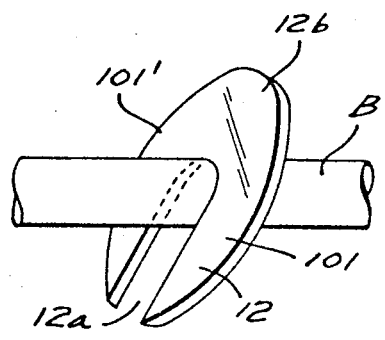
FIG. 5a is a fragmentary schematic perspective view of a modification of the elliptic mirror shown in FIG. 4.
Figure 5B:
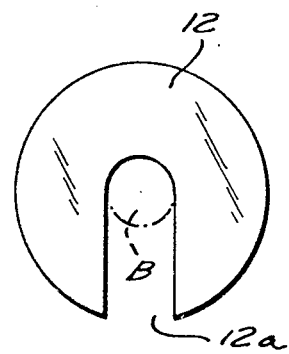

The reflecting portion 11c of the elliptic mirror 11 is not very effective since the rays reflected by the same are blocked by the barrel B. Therefore, the elliptic mirror is constructed in a modified embodiment as shown in FIGS. 5a and 5b. A cutout 12a in an elliptic mirror 12 eliminates the reflecting portion 11c so that only the lateral mirror portions 101 and 101' and the top portion 12b participate in forming the continuous image of the target area. In the end view of FIG. 5b the elliptic mirror 12 appears as a circle.

Figure 6:
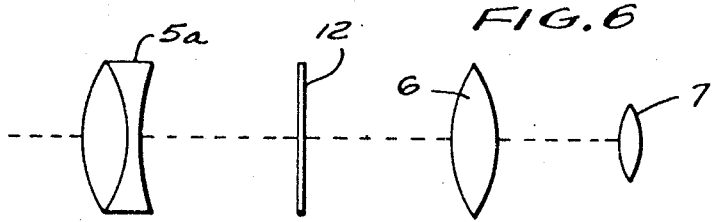
FIG. 6 is a fragmentary perspective schematic plan view of another modification of the embodiment of FIG. 4 in which an eyepiece is provided instead of the viewing screen.

FIG. 6 illustrates a further modification of the embodiment of FIG. 4. An annular objective lens 5a is disposed forwardly of the elliptic mirror which may be constructed as mirror 11, or provided with a cutout 12a as described with reference to FIGS. 5a and 5b. The two symmetrical mirror systems are omitted in FIG. 6, but it is shown that erector lens 6 forms an image for viewing through eyepiece 7 which is substituted for screen 10 of the embodiment of FIG. 4.

It will be understood that any embodiment having first slanted reflecting means, and optical means including other reflecting means and lens means for forming an image, may be provided with any combination of the following elements: An objective lens on the barrel, an objective lens rearward of the reflecting means and above the barrel, a viewing screen, an eyepiece, an elliptic mirror, and an elliptic mirror having a cutout.

FIG. 7 illustrates a simplified embodiment of the invention in which the first reflecting means is shown to be an elliptic mirror 11 having a central opening 11a for the barrel B. A mirror 13 is mounted above barrel B symmetrical to a vertical plane passing through the axis of the barrel and being slanted an angle of 45° to the same so as to be parallel to the elliptic mirror 11. The rays from the target area are reflected by mirror 11 and then by mirror 13 so as to enter the objective lens 5 which forms an image for viewing through the eyepiece 7. A viewing screen may be substituted, and the elliptic mirror can be provided with a cutout.

In the simplified embodiment of FIG. 8, an annular objective lens 5a surrounds the barrel B and is located forwardly of the elliptic mirror 11, for which an elliptic mirror 12 having a cutout may be substituted. A mirror 13 parallel to mirror 11 and having a rearwardly reflecting surface, as described with reference to FIG. 7, reflects the rays into an erector lens 6a which forms an image for viewing through eyepiece 7.

Figure 9:
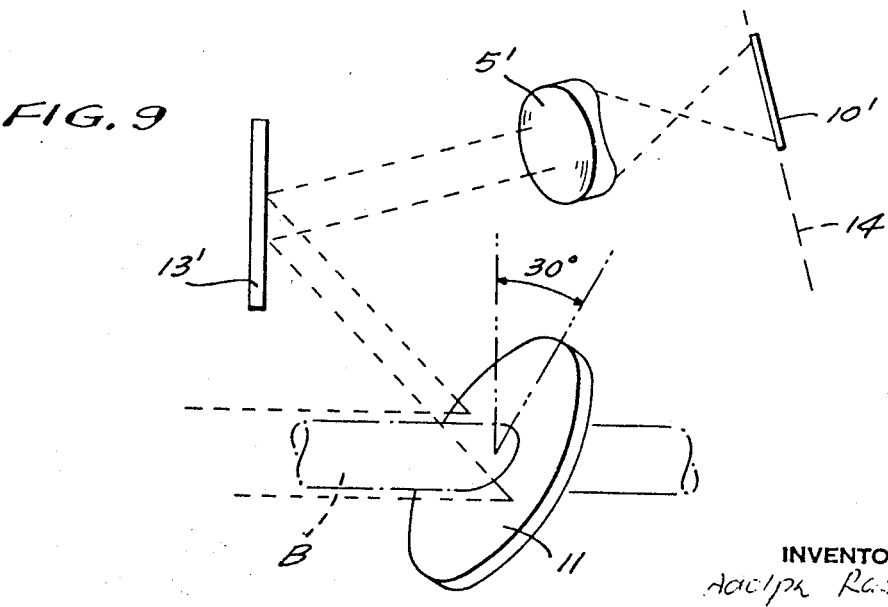
FIG. 9 is a fragmentary schematic perspective side view of a fifth embodiment provided with a slanted viewing screen.

FIG. 9 illustrates an arrangement similar to the embodiment of FIG. 7, but provided with a viewing screen corresponding to the embodiment of FIG. 4. Mirror 13' is placed forwardly of the slanted mirror 11 and oriented in a plane transverse to the barrel axis which forms an angle of 30 degrees with the plane in which mirror 11 is located. The rays reflected by mirror 13' pass through a focussing lens system 5' onto a screen 10' in the focal plane 14 which forms an angle of 60 degrees with the barrel axis. This arrangement permits viewing along the barrel axis, but the aiming person does not have to sight along the barrel axis since the eye can be placed above screen 10'. The downward viewing provided by the slanted screen 10'; on which a real image of the target area and the cross hairs of the reticle appear, advantageously facilitates quick aiming without requiring raising of the gum to shoulder height.

In a similar manner, the mirrors 4 and 4' of the embodiment of FIG. 7 can be slanted in such a manner that the reflected rays are projected at an angle to the barrel axis onto a slanted screen. The barrel may then be aimed at a target by viewing the screen and the reticle from above, as explained with reference to FIG. 9. However, even if screen 10 is located in a plane perpendicular to the barrel axis, as shown in FIG. 4, the reticle of screen 10 can be used for aiming at the target area by properly locating the cross hairs of the reticle on the image of the target appearing on the screen, and it is not necessary to look along a line of sight along the barrel at the target area. The viewing parallax error associated with viewing through a screen is eliminated.

Elliptic mirrors 11 or 12, slanted to the barrel axis have been described with reference to FIGS. 4 to 9. The elliptic shape is preferred since it provides additional reflective surface area needed for compensating loss of light intensity caused by the slant of mirror 11 or 12 relative to the barrel. The effectiveness of a circular mirror mounted on the barrel would be substantially reduced by the slanted position. Evidently, the elliptic shape is not mandatory, and digerently shaped mirrors oblong in vertical direction may be used.

In all embodiments of the invention, rays coming from the target are reflected by first slanted reflecting means located at the level of the barrel axis, and pass through optical means including other reflecting means and lens means for forming an image of the target area which is neither upside down nor laterally reversed. Due to the fact that the first reflecting means is located at the level of the barrel axis, the viewed image is free of parallax.

The reticle, which is placed in the focal plane of the lens system, is preferably interchangeable and contains the necessary information for the evaluation of target size, distance, and windage.

It will be understood that each of the elements described above, or two or more together, may also find a useful application in other types of telescopic sights differing from the types described above.

While the invention has been illustrated and described as embodied in a parallax-free telescopic rifle sight including mirror surfaces on opposite sides of the barrel and slanted at an angle of substantially 45°, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed is:

1. Parallax-free telescopic sight in combination with a barrel to be aimed at a target area, and comprising two first reflecting means slanted to the barrel and having two slanted reflecting surfaces located on opposite sides of the barrel for upwardly reflecting two bundles of rays coming from the target area; two second reflecting means disposed above said two first reflecting means, respectively and optically aligned therewith, for reflecting said bundles of rays along the barrel; two third reflecting means optically aligned with said two second reflecting means for reflecting said bundles of rays inward in a direction transverse to the barrel; two fourth reflecting means located between and optically aligned with said two third reflecting means for rearwardly reflecting the reflected transverse bundles of rays; objective means including lens means receiving said bundles of rays from said fourth reflecting means and forming an image of the target area; and viewing means optically aligned with and disposed rearward of said objective means for viewing said image.

2. Telescopic sight as claimed in claim 1 wherein said two second, third, and fourth reflecting means are disposed above the barrel symmetrical to a vertical plane passing through the axis of the barrel; wherein said two first reflecting surfaces are slanted at an angle of substantially 45° to a horizontal plane passing through the axis of the barrel; wherein said two second reflecting means define angles substantially of 90° with said two first reflecting means, respectively, and reflect said bundles of rays parallel to a vertical plane passing through the axis of the barrel; wherein said two third reflecting means define angles of substantially 90° with said two fourth reflecting means, respectively; wherein said two fourth reflecting means are disposed to reflect said two bundles of rays rearward parallel to said vertical plane; and wherein said lens means is located rearward of said two fourth reflecting means and has an optical axis located in said vertical plane for forming said image in a plane perpendicular to said axis of the barrel.

3. Telescopic sight as claimed in claim 2 wherein said objective means comprise other lens means located adjacent said barrel forwardly of said first reflecting means so that the latter receive rays from the target area through said other lens means, said other lens means cooperating with said rearward located lens means to form said image in said perpendicular plane.

4. Telescopic sight as claimed in claim 3 wherein said other lens means is annular and surrounds said barrel.

5. Telescopic sight as claimed in claim 1 wherein said two first reflecting means and said two second reflecting means are two pairs of mirrors forming two first units located on opposite sides of the barrel; and wherein said two third reflecting means and said two fourth reflecting means are two pairs of mirrors forming a second unit extending across the barrel forwardly of said first units.

6. Telescopic sight as claimed in claim 1 wherein said two first reflecting surfaces are two lateral portions of a mirror, and comprising at least a third portion of said mirror located above the barrel and forming with said two lateral portions a continuous planar reflecting surface.

7. Telescopic sight as claimed in claim 1 comprising means for mounting said two first, second, third and fourth reflecting means in such a relative position on the barrel that the two image portions formed of said two bundles of rays are adjacent each other and form an uninterrupted continuous image of the target area.

8. Telescopic sight as claimed in claim 1 wherein said optical means include a rearwardly reflecting mirror located above said barrel and said reflecting means and forwardly of the latter in a plane transverse to the barrel axis and defining a first acute angle with the plane in which the reflective surfaces of said reflecting means are located, and lens means for focussing rays reflected by said mirror onto an image plane forming a second acute angle with said barrel axis; and wherein said viewing means include a viewing screen and a reticle located in said image plane inclined to a horizontal plane so that a person aiming can look downward to said viewing screen without raising the said barrel to eye level.

9. Telescopic sight as claimed in claim 8 wherein said first acute angle is approximately 30° and said second acute angle is approximately 60°.

10. Telescopic sight as claimed in claim 1 wherein said two reflecting means are lateral portions of a mirror which is oblong in vertical direction.

References Cited

UNITED STATES PATENTS

| | | | |
|---|---|---|---|
| 708,820 | 9/1902 | Konig | 350—53 |
| 1,000,607 | 8/1911 | Kellner | 350—51 |
| 2,183,530 | 12/1939 | Alkan. | |
| 2,482,822 | 9/1949 | Zaroodny | 33—50.5 |
| 2,537,962 | 1/1951 | Brown | 350—53 |
| 2,925,751 | 2/1960 | Miles | 350—35 |
| 3,178,824 | 4/1965 | Callihoe | 33—51 |
| 3,298,770 | 1/1967 | Rosendahl | 350—53 |

PAUL R. GILLIAM, Primary Examiner

U.S. Cl. X.R.

33—50; 350—10, 50, 55; 356—254